UNITED STATES PATENT OFFICE.

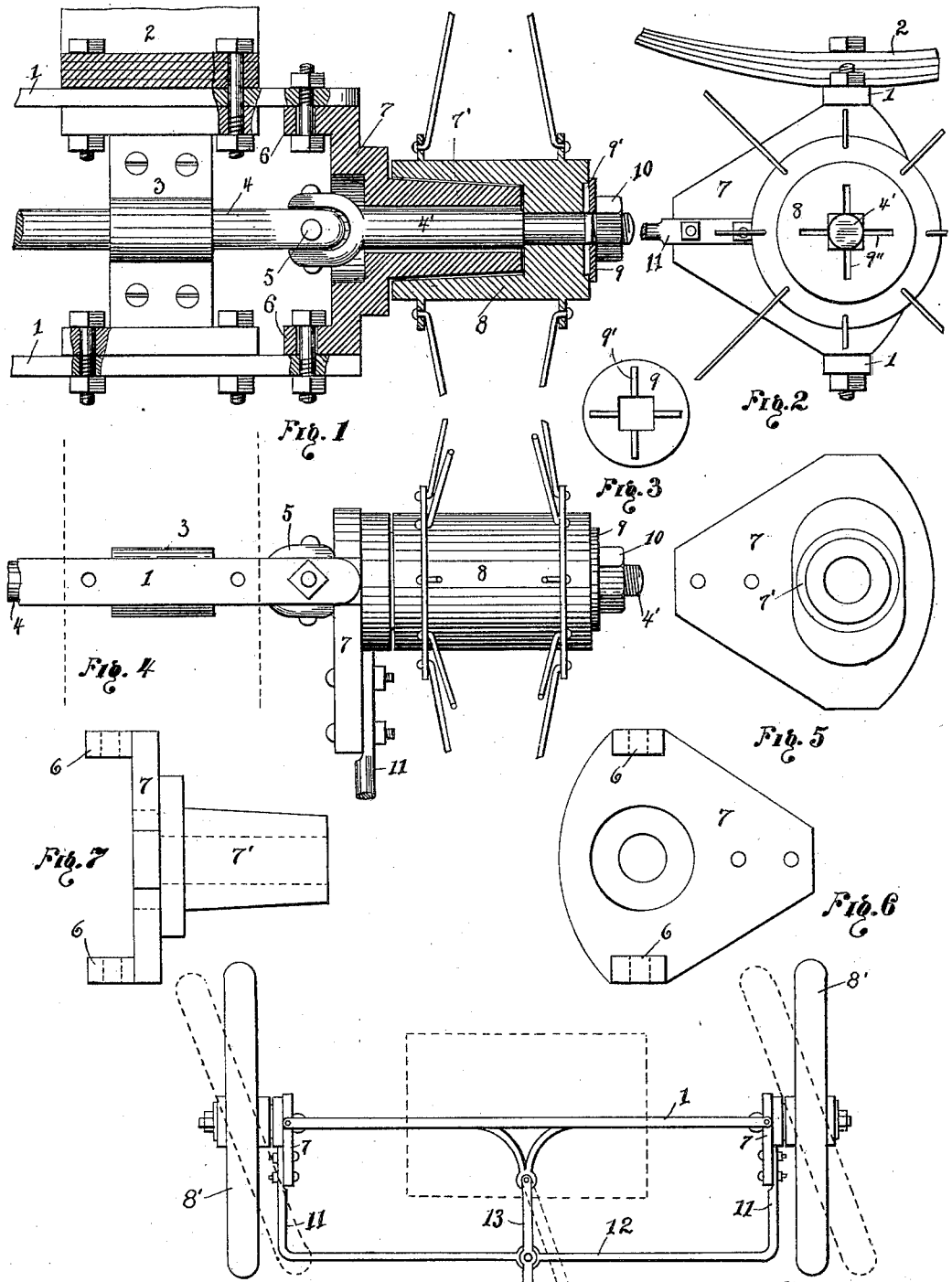

CHARLES HALL, OF ST. LOUIS, MISSOURI.

DRIVING AND STEERING GEAR FOR AUTOMOBILES.

SPECIFICATION forming part of Letters Patent No. 684,754, dated October 15, 1901.

Application filed February 16, 1901. Serial No. 47,617. (No model.)

*To all whom it may concern:*

Be it known that I, CHARLES HALL, a citizen of the United States, residing at St. Louis, State of Missouri, have invented certain new and useful Improvements in Automobile Driving and Steering Gears, of which the following is a full, clear, and exact description, reference being had to the accompanying drawings, forming a part hereof.

My invention has relation to improvements in automobile driving and steering gears; and it consists in the novel construction and arrangement of parts more fully set forth in the specification, and pointed out in the claim.

In the drawings, Figure 1 is a middle vertical section taken through the wheel-hub and parts carrying the same, a part of the truck and axle being shown in elevation. Fig. 2 is an end view of the parts, the nut and locking-disk being removed. Fig. 3 is a plan of the inner face of the disk coupling the axle to the hub. Fig. 4 is a top plan of parts shown in Fig. 1. Fig. 5 is a detached end view of the oscillating hub-bearing. Fig. 6 is a view looking in the direction opposite to that of Fig. 5. Fig. 7 is a view at right angles to the general length of the hub-bearing, and Fig. 8 is a diagrammatic view showing manner of actuating the hub-bearing and steering the vehicle.

The object of my invention is to construct a driving-gear for automobiles which will permit the steering of the wheels at the end of the axle, so that the axle as a body shall remain undisturbed, the deflection of the wheels being accompanied by the angular or oscillating movement of the axle-termini to which the movement of the hub bearing or support conforms.

In detail the invention may be described as follows:

Referring to the drawings, 1 represents one end of the front truck, to which the wagon-supporting springs 2 are secured in any well-known mechanical manner, the truck being mainly in the form of two parallel bars, between which is secured the axle-bearing 3, the axle proper being designated by 4. Each end of the axle has pivotally secured thereto by a universal joint 5 an extension 4', said extension always revolving with the axle whether it is in line with the axis of rotation thereof or at an angle thereto, the joint 5 permitting rotation of the extension under all circumstances. Pivoted to the truck-bars by means of ears 6, formed with the expanded base 7 thereof, is the tubular hub bearing or support 7', said bearing loosely embracing the axle extension 4'. The hub-bearing under the circumstances is free to oscillate about the ears 6 in a horizontal plane, the extension 4' in all cases oscillating with it, said extension being positively coupled to the hub 8 by the locking-disk 9, passed over a square portion of the outer reduced end of the extension, the inner face of the disk being provided with a series of ribs 9', adapted to enter corresponding depressions 9" in the hub, the parts being held in such coupled position by the nut 10.

The expanded base 7 of the hub-bearing is virtually triangular, the vertex opposite the axis of oscillation of said hub-bearing having secured thereto an arm 11, each pair of arms being connected by a cross-bar 12, which may be moved laterally by a hand-lever 13, pivoted or fulcrumed at a suitable point on the carriage-body and within easy reach of the operator. This lever 13 is coupled loosely to the bar 12, and upon swinging the lever 13 to the left or right (see Fig. 8) the bar 12 will be shifted in the same direction and the arms 11 jointly will oscillate in the same direction, their oscillation in turn oscillating the hub-bearings 7'. Such oscillation or deflection produces a corresponding deflection of the axle extensions 4' from the general axis of rotation of the axle proper, and the wheels 8' will now be deflected to rotate in a plane whose direction will depend on the angle of oscillation or throw of the lever 13. Thus the vehicle can be steered in any direction by simply throwing the steering-lever 13 to the right or left of its central or normal position. I do not herein show the motor by which the axle is driven, as that forms no part of the present invention. I do not wish to be understood as limiting myself to the precise details here shown, as they may be departed from without affecting the spirit of my invention. For example, the manner of coupling the axle extension 4' to the hub may be changed and other alterations may be resorted to as may suggest themselves to the skilled mechanic.

In Fig. 8 the dotted positions of the wheels indicate the angle of deflection to which the hub-bearings (and axle extensions within them) were subjected by the throw of the lever 13, (indicated in its dotted position.)

Having described my invention, what I claim is—

An automobile driving and steering gear comprising a truck, an axle mounted in the same, an axle extension connected thereto by a universal joint, a hub-bearing having an expanded base and a tubular outer portion, said expanded base having lugs or ears whereby the same is pivotally secured to the truck and adapted to oscillate in a horizontal plane, the axle extension having a reduced end provided with a square or polygonal portion, a locking-disk passed over said square portion, a series of ribs on the inner face of the disk, corresponding depressions being formed in the hub for the reception of the ribs for securing the axle extension to the hub of the wheel at a point beyond the tubular portion of the hub-bearing, arms secured to the expanded bases of two opposite hub-bearings, a connecting cross-bar for such arms, and a pivoted lever connected to the cross-bar, the parts operating substantially as and for the purpose set forth.

In testimony whereof I affix my signature in presence of two witnesses.

CHARLES HALL.

Witnesses:
 ROBERT LUCAS,
 W. C. KILLEEN.